United States Patent [19]
Collin

[11] Patent Number: 5,346,517
[45] Date of Patent: Sep. 13, 1994

[54] METHOD OF MANUFACTURING INSERTS PREFERABLY FOR MACHINING OF HEAT RESISTANT MATERIALS

[75] Inventor: Marianne Collin, Enskede, Sweden

[73] Assignee: Sandvik AB, Sandviken, Sweden

[21] Appl. No.: 857,275

[22] Filed: Mar. 25, 1992

[30] Foreign Application Priority Data

Mar. 25, 1991 [SE] Sweden .................................. 9100895

[51] Int. Cl.$^5$ .................... B24D 3/34; C04B 35/52
[52] U.S. Cl. .................................. 51/309; 51/293; 501/87; 501/89; 501/91; 501/92; 501/93; 501/95
[58] Field of Search ............... 501/87, 89, 91, 92, 501/93, 95, 264; 264/177.11, 211.11, DIG. 19; 51/293, 309

[56] References Cited

U.S. PATENT DOCUMENTS

| | | | |
|---|---|---|---|
| 4,543,345 | 9/1985 | Wei | 501/95 |
| 4,745,091 | 5/1988 | Landingham | 501/87 |
| 4,789,277 | 12/1988 | Rhodes et al. | 501/95 |
| 4,804,645 | 2/1989 | Ekstrom | 501/95 |
| 4,849,381 | 7/1989 | Brandt et al. | 501/89 |
| 4,867,761 | 9/1989 | Brandt et al. | 51/309 |
| 4,920,838 | 5/1990 | Brandt et al. | 501/95 |
| 5,057,465 | 10/1991 | Sakamoto et al. | 501/90 |
| 5,059,564 | 10/1991 | Mehrotra et al. | 501/89 |
| 5,110,770 | 5/1992 | Brandt et al. | 501/92 |

FOREIGN PATENT DOCUMENTS 444426 9/1991 European Pat. Off. .
61-058868 8/1984 Japan .

OTHER PUBLICATIONS

Becher et al. Communications of the American Ceramic Society, Dec. 1984, "Toughened Behavior in SiC--Whisker-Reinforced Alumina", pp. C267-C269.
Patent Abstracts of Japan, vol. 14, No. 47 (C-682) Jan. 29, 1990 & JP 1,278,479 (Hitachi Metals Ltd.) Nov. 8, 1989.

*Primary Examiner*—Mark L. Bell
*Assistant Examiner*—Deborah Jones
*Attorney, Agent, or Firm*—Burns, Doane, Swecker & Mathis

[57] ABSTRACT

The present invention relates to whisker reinforced ceramic bodies with new and improved properties. By replacing the tool pressing with injection molding, surprisingly a more homogeneous structure and more advantageous whisker orientation has been obtained. By choosing the conditions of the molding, it is possible to control the whisker orientation to get optimal material properties. Bodies according to the invention are particularly suitable for chip forming machining of heat resistant materials.

7 Claims, 1 Drawing Sheet

METHOD OF MANUFACTURING INSERTS PREFERABLY FOR MACHINING OF HEAT RESISTANT MATERIALS

BACKGROUND OF THE INVENTION

The present invention relates to a method of manufacturing cutting tool inserts preferably for machining of heat resistant materials.

For machining of cast iron and heat resistant materials, ceramic inserts based on alumina are usually used. Such inserts are very sensitive to thermal cracks since the material has relatively low thermal conductivity. This leads to short tool life under conditions leading to thermal shocks, i.e., high edge temperatures, short engagements times and varying cutting depths.

To a certain extent, the thermal properties of alumina ceramic inserts can be improved by the addition of TiC and/or TiN whereby the thermal conductivity increases. But at the same time, the toughness behavior increases only moderately and the material can only be used at relatively low feeds.

A later step in the development comprises additions of fine-grained $ZrO_2$-particles to the alumina matrix. The transformation of the metastable $ZrO_2$-particles during use increases both strength and toughness. The thermal properties are only slightly better.

It has more recently been shown that the fracture toughness of a ceramic material can be increased by addition of monocrystalline hair crystals (whiskers) and/or platelets. A material consisting of SiC-whiskers in an alumina matrix is disclosed in U.S. Pat. No. 4,543,345. U.S. Pat. No. 4,867,761 discloses the use of carbides, nitrides or borides of Ti and/or Zr in an alumina matrix. Through U.S. Pat. No. 4,849,381, a cutting tool comprising a mixture of whiskers and platelets is known.

The combination of $Al_2O_3$-matrix + SiC-whiskers is commercially available as inserts for machining. Such inserts are generally manufactured by uniaxial pressure sintering. This method is, however, unsuitable for inserts with more complex geometries.

Inserts of more conventional materials, e.g., non-reinforced ceramics and cemented carbide are usually manufactured by tool pressing. In this method, powder is compacted to a solid body in a tool comprising a die and two punches. Granulated powder comprising the ceramic material and one or more binders, e.g., polyvinylalcohol and with good flow properties is filled into the die and compacted by pressing the upper punch with a certain force against the lower, usually fixed, punch. Through a suitable shape of the punches, the insert is given a suitable chip breaking geometry. A drawback with tool pressing is that the relative density varies within the body. This variation in relative density is particularly large for complex bodies with large differences in compacted height.

Also, material reinforced with whiskers and/or platelets can be tool pressed. Hereby, very high compaction pressures are needed in order to obtain a reasonable relative density. In order to obtain an even filling in the tool also in this case granulated powder is needed. The most common method for granulation is spray drying. However, during spray drying the whiskers are drawn into the middle of the granules and the granule borders are partially depleted of whiskers. In addition, the granules that are armoured by the whiskers and also contain a binder cannot be completely crushed during the compaction. This leads to an uneven structure in the sintered material.

Injection molding is a common production method in the plastics industry for the production of "net-shape" or "near-net-shape" parts. A paste comprising thermoplastic or thermohardening polymers is heated to a suitable temperature and forced through a nozzle into a form with desired geometry. The technique is also used in powder metallurgy for the manufacture of relatively complex parts starting from metallic or ceramic powders. Hereby, the metallic or ceramic powder is mixed with polymers. After the shaping, the polymer is driven off and after that the part is sintered in essentially the same way as for corresponding tool pressed parts.

OBJECTS AND SUMMARY OF THE INVENTION

It is an object of this invention to avoid or alleviate the problems of the prior art.

It is also an object of this invention to provide a whisker-reinforced ceramic cutting insert having improved properties.

It is further an object of this invention to provide a whisker-reinforced cutting insert, the properties of which can be altered by orientation of the whisker reinforcements.

In one aspect of the invention there is provided a ceramic body comprising 10–40 volume % single crystal whiskers homogeneously and essentially unidirectionally disposed in a ceramic matrix, said body being essentially free from granule borders.

In another aspect of the invention there is provided the method of manufacturing a ceramic body comprising 10–40 volume % single crystal whiskers homogeneously and essentially unidirectionally disposed in a ceramic matrix by powder metallurgical methods comprising dispersing a ceramic powder and said whiskers in water or an organic solvent, drying said dispersion, mixing said dried powder with an organic binder system, extruding the bound powders into a mold with desired geometry and finishing the body.

In a further aspect of the invention, there is provided a method of cutting metal or metal alloys wherein a cutting tool is brought into contact with a workpiece and the cutting tool and workpiece move relative to each other whereby material is removed by the cutting tool from the workpiece the improvement comprising using a cutting tool comprising a ceramic body comprising 10–40 volume % single crystal whiskers and essentially unidirectionally disposed in a ceramic matrix, said body being essentially free from granule borders, the improvement comprising using that insert.

According to the invention there is now provided a way of manufacturing whisker-reinforced ceramic inserts with complex geometry with even structure and favorable whisker orientation by injection molding.

DETAILED DESCRIPTION OF THE PREFERRED EMBODIMENTS OF THE INVENTION

Figure 1:
FIG. 1 shows the microstructure in 200X of a ceramic material of $Al_2O_3$ reinforced with SiC-whiskers manufactured by tool pressing.

The invention, thus, relates to a way of manufacturing inserts of whisker-reinforced ceramics by injection molding. It has surprisingly turned out that by this method a material is obtained with homogeneous structure essentially free from granule borders and with an essentially unidirectional whisker orientation. By choosing the conditions of the molding, it is possible to control the whisker orientation to get optimal material properties.

The invention also relates to an insert for chip forming machining made in this manner with a polygonal or round shape, an upper face, an opposite face and at least one clearance face intersecting said upper and lower faces to define cutting edges. The insert is provided with devices for good chip breaking and for clamping in a holder. The ceramic material is preferably alumina-based and comprises, in addition to conventional sintering aids, 10–40%, preferably 25–35%, by volume of single crystal whiskers of carbides, nitrides and/or borides of Si, Ti, Zr, Hf, Ta, and/or Nb or solid solutions thereof. The whisker material consists of hair-shaped monocrystals with a diameter of 0.2–10 $\mu$m, a length of 2.5–100 $\mu$m and a length/diameter ratio of preferably 5–10. The whisker material can partly be replaced by platelets, i.e., monocrystal plates with a diameter of 0.5–40 $\mu$m and a diameter/thickness ratio of 5–50, preferably 10–20.

The grain size of the ceramic matrix shall be $<10$ $\mu$m, preferably $<4$ $\mu$m. The matrix is essentially ceramic oxides or ceramic oxides mixed with hard carbides and/or nitrides and/or borides and/or binder metal. The ceramic matrix shall preferably contain $<20$ volume % $ZrO_2$. The relative density shall be at least 95%, preferably 98%, most preferably 99%.

The method according to the invention is characterized in that the ceramic raw materials (including the ceramic whiskers) are thoroughly mixed suitably by dispersion in water or any type of organic solvent. The dispersion can be facilitated/improved by addition of an organic solvent and/or by adjustment of the pH-value value when dispersing in water. The dispersion is dried, e.g., by spray drying to form granules of about 100 $\mu$m diameter, e.g., about 50–200 $\mu$m diameter. The well-mixed ceramic powder granules obtained in this way are then mixed with a binder system adapted to injection molding which binder system is a mixture of at least one additive of the type polyethylene, polypropylene, polystyrene, polyvinylchloride, polyvinylalcohol, polyvinylacetate, wax or stearic acid and, in addition, organic additives having a dispersing, wetting, lubricating and/or viscosity adjusting function as desired. The mixing is performed in a kneader. During this mixing the spray dried granules are completely crushed. The paste obtained is filled into the injection molding machine.

Injection molding is performed in a conventional injection molding machine. The filling rate is kept within the range 0.1–10 cm$^3$/s, preferably 0.5–2 cm$^3$/s. The pressure is 5–300 MPa, preferably 50–150 MPa, and the temperature is chosen within the range of 40°–200° C. Preferential whisker orientation parallel with the flow direction is obtained by a convergent flow channel. Alternatively, whisker orientation perpendicular to the flow direction can be obtained in a divergent flow channel. Both channels are conventional.

The flow channel, the inlet and the mold are designed in such a way that the whisker orientation obtained gives optimal cutting properties depending upon the cutting application. Such design is within the skill of the artisan and is dependent on the type of wear which occurs in a particular machining operation. For example, when notch wear is the dominating wear type, the whisker orientation should preferably be perpendicular to the clearance face. This is a common case when machining heat resistant materials.

After the injection molding, the polymer is driven off in inert atmosphere, reducing atmosphere or in vacuum by increasing successively the temperature with the speed 1°–500° C./h, preferably 10°–50° C./h, depending on the thickness of the body. The final temperature for the debinding lies in the range 400°–800° C. After the debinding, the body can be presintered in a separate step. The presintering is performed in an inert atmosphere or in a reducing atmosphere with a final temperature of 800°–1500° C. after which the debound-presintered or only debound body is sintered, hot isostatic pressed, gas pressure sintered or heat treated in any other way. For hot isostatic pressing, the method according to U.S. patent application Ser. No. 07/828,952, filed Feb. 10, 1992, and hereby incorporated by reference, is particularly suitable. The sintered body is finished to an insert with desired shape and dimension by, e.g., grinding.

The method according to the invention is particularly suitable for the manufacture of inserts for machining with complex geometry of whisker-reinforced ceramics. An almost even density is obtained in the entire injection molded body. With the method, considerably higher relative densities, about 65%, for materials with high whisker content can be obtained than by conventional tool pressing, 45–50%. The high relative density remains after the debinding whereas tool pressed material expands during the debinding and the relative density decreases to 40–45%. During this expansion there is a risk for cracks being generated in the tool pressed material especially in parts of the material with a gradient in the relative density. Sintered material made according to the invention is more homogeneous and free of granule borders.

The invention has above been described with reference to inserts for machining. It is obvious to the man of the art that the invention can be applied to other ceramic parts reinforced by whiskers such as seals, gaskets and other wear parts and structural ceramics.

The invention is additionally illustrated in connection with the following Examples which are to be considered as illustrative of the present invention. It should be understood, however, that the invention is not limited to the specific details of the Examples.

EXAMPLE 1

Three ceramic samples with the same composition, i.e., 75 weight % $Al_2O_3$ with sintering aid and 25 weight % SiC-whiskers were manufactured according to the following:

The first sample, referred to as sample A, was manufactured according to the conventional technique, i.e., uniaxial pressure sintering. After the pressure sintering, the sample was cut, surface ground and periphery ground to diameter 6 mm and height 6 mm. Then a chipping angle was ground in the sample with 5° angle and finally the sample was edge treated to an edge radius of about 30 μm.

The second sample, sample B, was manufactured in a so-called Q-cut TM geometry by tool pressing. This geometry is shown, for example, in U.S. Pat. No. 4,801,224. This geometry consists of an insert and a holder. The insert differs from sample A in that Q-cut TM has a chip breaker. Before the spray drying, the ceramic raw materials were mixed with organic binders. The compacted blank was treated in a combined debinding and presintering cycle in a graphite furnace. The final temperature was 1300° C. and the furnace atmosphere was hydrogen. The presintered blank was dipped with a suction cup in a BN-slurry and then in a mullite slurry according to the above-mentioned U.S. patent application Ser. No. 07/828,952, filed Feb. 10, 1992. The dipping was performed in such a way that first half of the blank was dipped in the BN-slurry, whereafter the layer was allowed to dry and then the other half was dipped. During all dipping steps, the sample was evacuated with the aid of the suction cup in order to avoid blistering in the layer. The blank, which now was surrounded by a covering BN-layer and on top of this a covering mullite layer was placed in a glass powder bed and after that sintered by isostatic pressing at high temperature. Before the isostatic pressing the glass was melted in order to isolate the blank from the overpressure in the furnace. The sintering was performed at 1550° C. and 160 MPa. The microstructure of the material was uneven with visible granule structure, see FIG. 1.

Figure 2:
FIG. 2 shows the microstructure in 200X of corresponding material manufactured by injection molding according to the invention.
Figure 3:
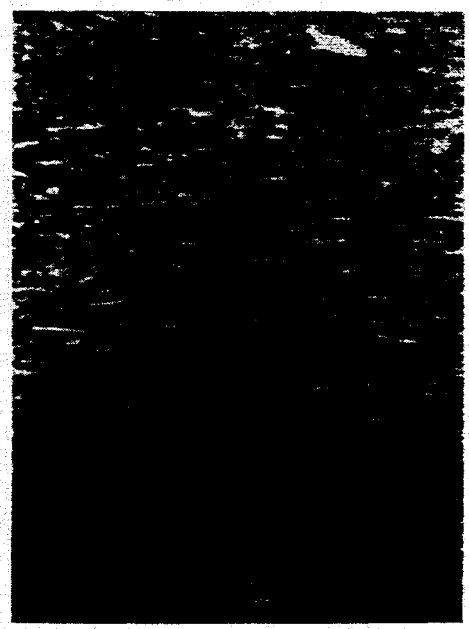
FIG. 3 shows in 1000X the whisker orientation in the rake face in a ceramic insert manufactured according to the invention.
Figure 4:
FIG. 4 shows in 1000X the whisker orientation in the clearance face in a ceramic insert manufactured according to the invention.

The third sample, sample C, was manufactured according to the invention in a specially designed mold to get the same shape as sample B. The same powder as that used for sample A was mixed with a mixture of polyethylene, paraffin wax and stearic acid in a kneader and thereafter injection molded. The injection molded blank was debound/presintered and hot isostatic pressed in the same way as sample B. The resulting structure was even and without granules see FIG. 2. The finishing of samples B and C was made at the same time by grinding a v-track in the bottom side and the insert was peripherally ground to 6 mm diameter. Hereby in sample C, the part of the material which was removed had preferential whisker orientation parallel to the clearance face. Thus, after the periphery grinding the whisker orientation was preferentially parallel to the rake face, see FIG. 3, and perpendicular to the surface of the clearance face, see FIG. 4.

The samples A, B and C were edge treated in the same way and at the same time.

EXAMPLE 2

The samples from the preceding Example were tested in a longitudinal turning operation according to the following:

| Workpiece: | Inconel 718A |
| --- | --- |
| Cutting speed: | 200 m/min |
| Cutting depth: | 1 mm |
| Feed: | 0.15 mm/rev |
| Result: | |
| | Time to notch wear > 2.5 mm in minutes |
| Sample A | 5 |
| Sample B | 6 |
| Sample C | 8 |

The insert manufactured according to the invention, thus, showed about 30% longer life in Inconel 718 thanks to better resistance against notch wear. This is explained by the more favorable whisker orientation.

EXAMPLE 3

Two ceramic samples with the same composition, i.e., 76% by weight $Al_2O_3$ and 24% by weight SiC-whiskers were manufactured according to the following:

The first sample, sample A, was manufactured in a RCGX geometry by tool pressing. The ceramic raw materials were dispersed in water together with organic binders and spray dried whereafter the spray dried powder was tool pressed. The compacted blank was treated in a combined debinding and presintering cycle in a graphite furnace. The final temperature was 1300° C. and the furnace atmosphere was hydrogen. The presintered blank was dipped with a suction cup in a BN-slurry and then in a mullite slurry according to the above-mentioned U.S. patent application Ser. No. 07/828,952, filed Feb. 10, 1992. The dipping was performed in such a way that first half of the blank was dipped in the BN-slurry, whereafter the layer was allowed to dry and then the other half was dipped. During all dipping steps, the sample was evacuated with the aid of the suction cup in order to avoid blistering in the layer. The blank, which now was surrounded by a covering BN-layer and on top of this a covering mullite layer was placed in a glass powder bed and after that sintered by isostatic pressing at high temperature. Before the isostatic pressing, the glass was melted in order to isolate the blank from the overpressure in the furnace. The sintering was performed at 1550° C. and 160 MPa. The sintered sample was cut, face ground and peripheral ground to diameter 9.5 mm and clearance angle of 7°. Finally, the sample was edge treated to an edge radius of about 30 μm.

The second sample, sample B, was manufactured according to the invention in a specially designed mold. The powder was manufactured in the same way as for sample A but without binders and afterwards mixed with a mixture of polyethylene, paraffin wax and stearic acid in a kneader and thereafter granulated. The granules were fed to an injection molding machine with a convergent flow channel. The injection molded blank was debound, sintered, ground and edge treated in the same way and at the same time as sample A.

EXAMPLE 4

The samples from Example 3 were tested in a longitudinal turning operation according to the following:

| Workpiece: | Inconel 718A |
| --- | --- |
| Cutting speed: | 300 m/min |
| Cutting depth: | 0.9 mm |
| Feed: | 0.15 mm/rev |
| Result: | |
| | Time to notch wear > 2.5 mm in minutes |
| Sample A | 4 |
| Sample B | 6 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A ceramic body cutting tool insert comprising 10–40 volume % single crystal whiskers homogeneously and essentially unidirectionally disposed in a ceramic matrix.

2. The ceramic body of claim 1, wherein the ceramic matrix is essentially ceramic oxides or ceramic oxides mixed with one or more materials selected from the group consisting of hard carbides, nitrides and borides.

3. The ceramic body of claim 1, wherein the matrix is based on $Al_2O_3$ and contains whiskers of one or more materials selected from the group consisting of carbides, nitrides and borides of one or more elements selected from the group consisting of Si, Ti, Zr, Hf, Ta, Nb and solid solutions thereof.

4. The body of claim 1, wherein the ceramic body further comprises single crystal platelets.

5. The body of claim 1, wherein said body comprises an insert for chip forming machining where the cutting part has a polygonal or round shape with upper and lower faces and at least one clearance face intersecting said upper and lower faces and defining a cutting edge.

6. The body of claim 5, wherein said single crystal whiskers are oriented essentially parallel to said clearance face.

7. The body of claim 5, wherein said single crystal whiskers are oriented essentially perpendicular to said clearance face.

* * * * *